United States Patent Office 3,014,510
Patented Dec. 26, 1961

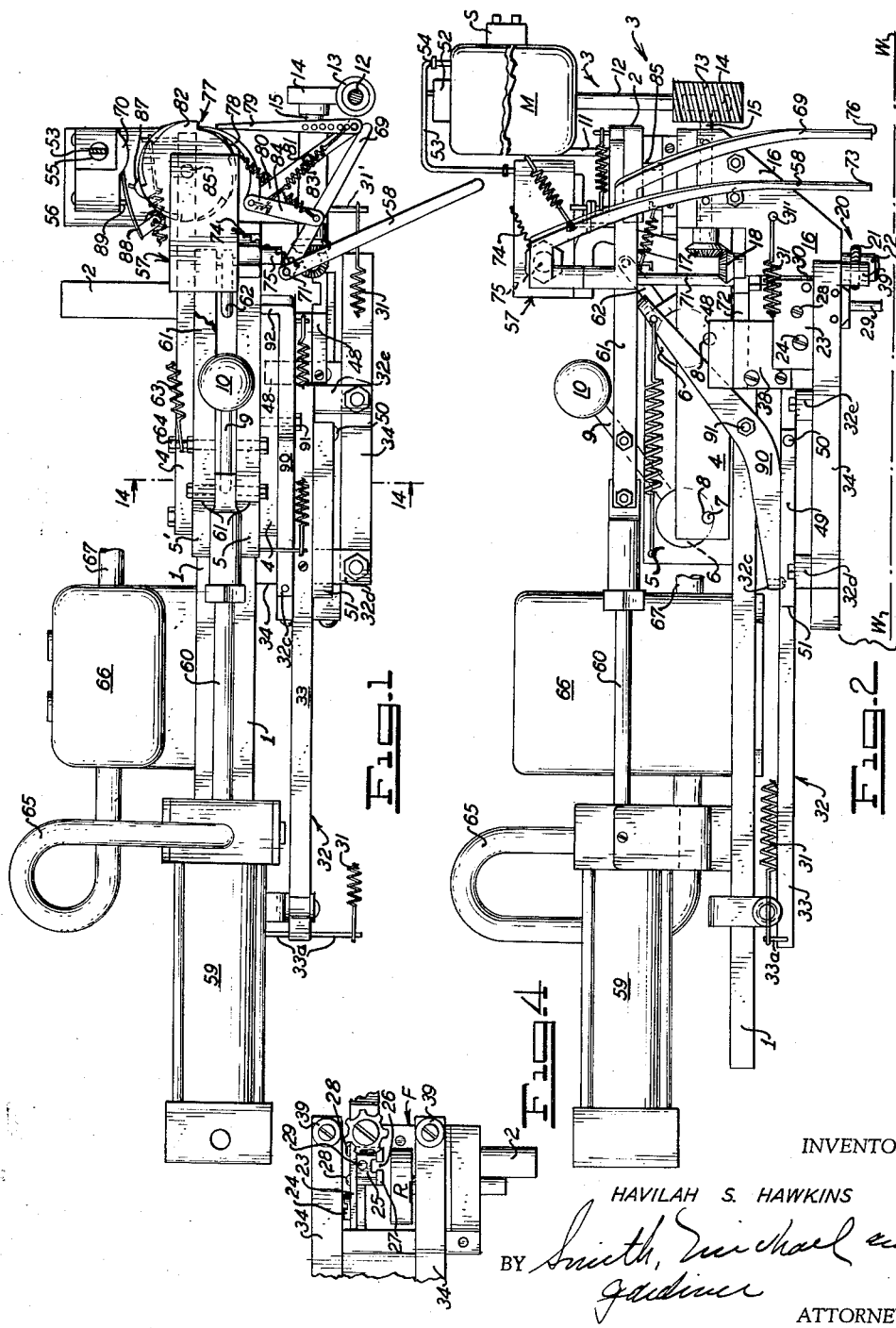

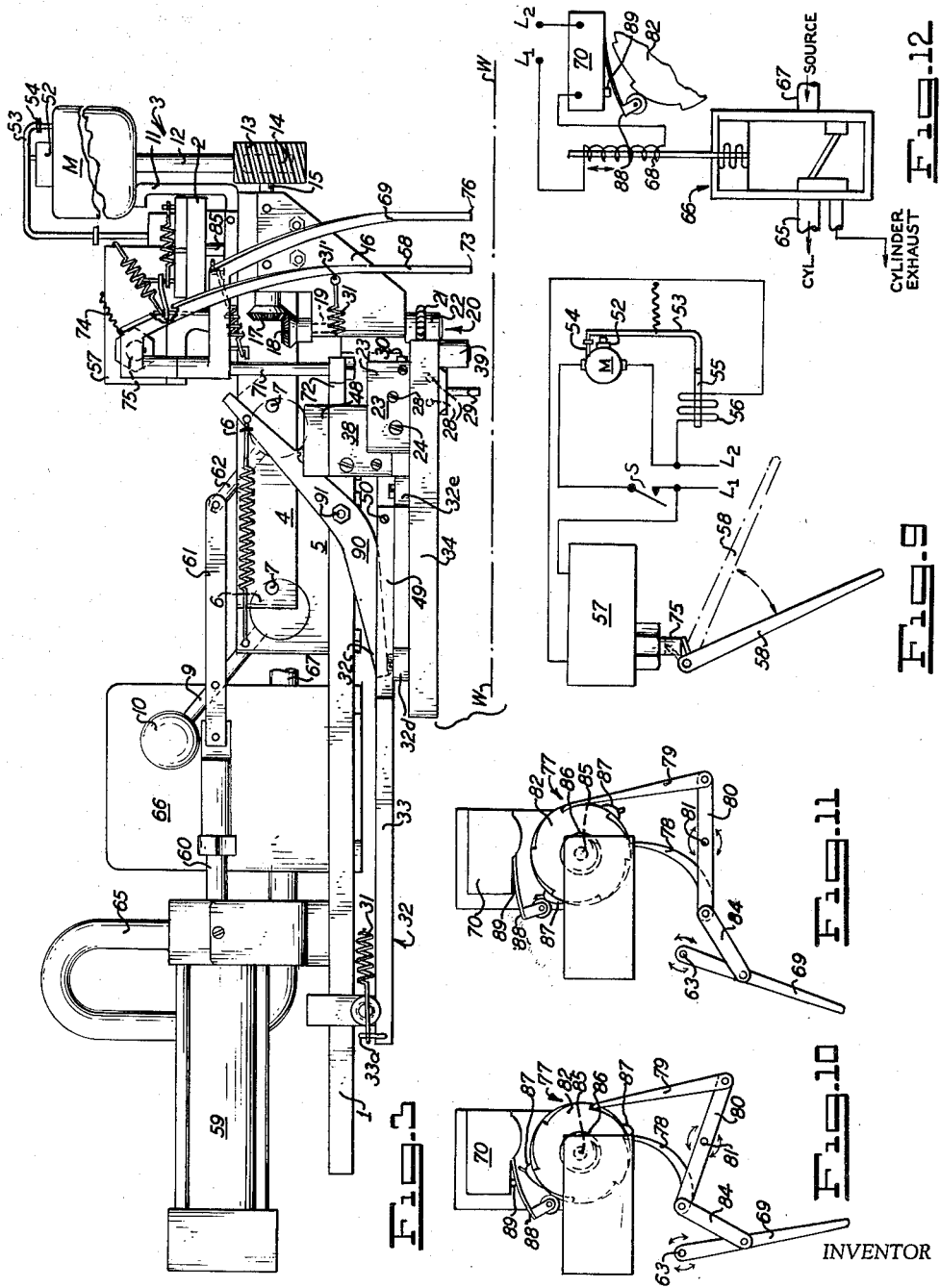

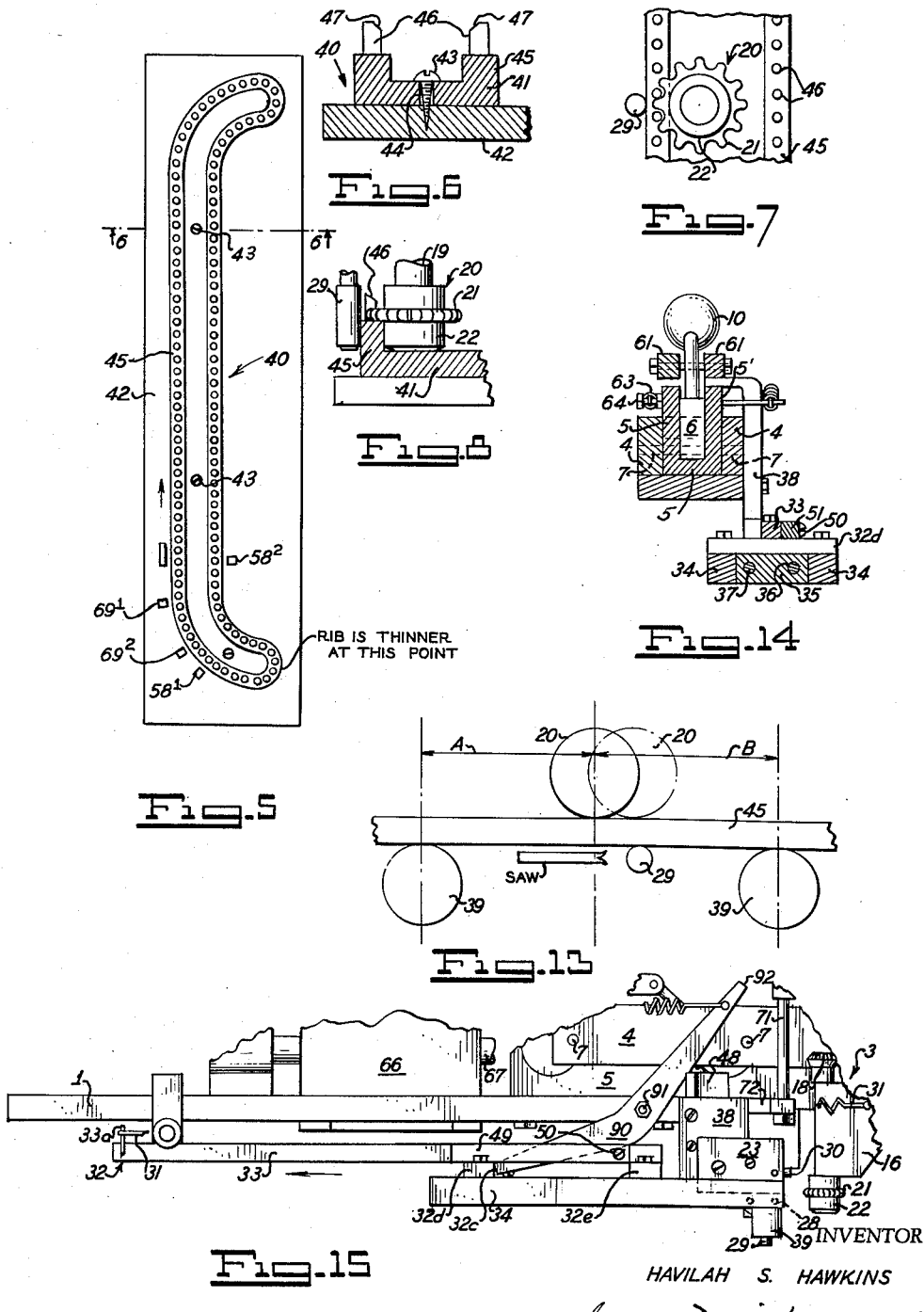

3,014,510
WORK FEED FOR BAND SAWS
Havilah S. Hawkins, Sedgwick, Maine
Filed Oct. 16, 1959, Ser. No. 846,886
12 Claims. (Cl. 143—26)

This invention is a work feeding means for power saws such as band saws and comprises driving and idle rollers adapted to engage opposite faces of an upstanding contoured pattern rib on a work unit inserted between the rollers and supported on the work table of the saw machine to feed the work unit to the saw in a rapid accurate manner.

The primary object of the invention is to provide a simple and effective arrangement of drive and idle rollers by which a work unit is automatically maintained in proper position throughout the sawing operation to be cut by the saw along a contoured line corresponding to and determined by a pattern rib member carried by the work unit and engaged by the rollers.

Another object of the invention is to provide a work feeding means which will operate automatically in response to sensing means which traverses a pattern member associated with a work piece.

Another object of the invention is to control power drive means for the work feeding means, in response to contours of a pattern member secured to a work piece, so that the work is fed to the saw at different speeds depending upon the peripheral contours of the pattern member in advance of the portion of the work piece being sawed.

Another object of the invention is to provide power operated means energized in response to movement of a sensing device which is arranged to traverse a pattern member secured to a work piece, to move the work feeding means into and out of operative position with respect to the saw.

Another object of the invention is to provide an intermittent motion transmission means between a pattern-traversing sensing means and a power means for actuating the power means to move the work feeding means into and out of operative position with respect to the saw.

These and other objects of the invention will become apparent from a consideration of the following specification when read in the light of the accompanying drawings, wherein FIG. 1 is a top plan view of the invention with some parts shown in section, FIG. 2 is a side elevation of the invention with the work feeding means in its lower operating position, but without a work unit in place, and with parts broken away, FIG. 3 is a view similar to FIG. 2 with the work feeding means in its elevated or inoperative position, FIG. 4 is a detail fragmental view of the bottom of the apparatus in the region of the saw guide means, FIG. 5 is a schematic view generally in top plan of a work unit including a pattern member and a work piece, and showing diagrammatically different positions of the sensing members with respect to the pattern member, FIG. 6 is a cross sectional view taken on the line 6—6 of FIG. 5, FIG. 7 is an enlarged fragmental schematic view showing the relation of the driving gear with respect to the pin teeth on the contoured rib of the pattern member, FIG. 8 is a fragmental sectional view showing the relation of the driving gear and roller with respect to the contoured rib and pin teeth of the pattern member, and the saw guide roller, FIG. 9 is a diagrammatic view showing the control circuit for the two-speed motor, FIG. 10 is a diagrammatic view showing the relative position of the parts of the ratchet motion transmission means between a sensing finger and a control switch for the power means which raises and lowers the work feeding head, showing the parts in the position in which the control switch is open, FIG. 11 is a diagrammatic view similar to FIG. 10 showing the parts in a position in which the control switch is closed, FIG. 12 is a diagrammatic view showing the control circuit and valve means for controlling the delivery of motive fluid to and exhaust of fluid from the power cylinder which raises and lowers the work feeding head, FIG. 13 is a diagrammatic view showing the relative positions of the work unit engaging rollers and the saw guide rollers, FIG. 14 is a transverse sectional view taken on the line 14—14 of FIG. 1, and FIG. 15 is a fragmentary side elevation of the apparatus showing the parts in the position they assume when the carriage latch is in latching position.

A preferred embodiment of the invention is shown in the accompanying drawings wherein like reference numerals designate like parts throughout. The invention as shown comprises a base frame member 1 to which a rearwardly projecting supporting stud 2 is secured, said stud 2 being designed for reception in and support from a suitable bracket member (not shown) secured to the head frame of a band saw machine. The stud 2 and frame 1 are related in a manner such as to position the invention, when in use, above the plane of the work table of the saw machine as indicated diagrammatically by the line W—W in FIGS. 2 and 3.

Work feeding head

The base frame 1 carries at the right-hand end thereof as viewed in the drawings, a movable work feeding head indicated generally by the reference character 3. The work feeding head is movably supported with respect to the base frame 1 for generally compound movement up and down and back and forth with respect to base frame 1. To this end, the work feeding head is mounted upon a pair of upstanding generally parallel spaced plate members 4—4 which are rigidly secured to and maintained in spaced relation by a spacing block (not shown) at their right-hand ends as viewed in the drawings. The plate members 4—4 lie on opposite sides of a bearing block 5 having spaced upstanding side walls 5'—5', secured to the base frame 1 in any desired manner. The bearing block 5 is provided with a pair of rotatably mounted bearing members 6—6 in the form of cylindrical studs which are mounted for rotation therein about parallel axes transversely of the bearing block 5 and in longitudinally spaced relation. The ends of the cylindrical studs or bearing members 6—6 carry eccentrically disposed pins 7—7 which extend from the opposite end portions of the bearing members 6—6 and are received within apertures 8—8 provided in the plates 4—4. The eccentric pins 7—7 of each bearing member are in coaxial alignment and all of the pins have the same degree of eccentricity with respect to the axes of the respective bearing members so that when one of the bearing members is rocked about its axis, the other bearing member will partake of an identical rotating movement about its axis. Thus the plate members 4—4 will partake of a compound movement and shift longitudinally of the base member 1 and up and down with respect thereto, to a degree dependent upon the eccentricity of the pins 7—7 with respect to their axes of oscillation. One of the bearing members 6—6 (the left-hand one as shown in the drawings) may be provided with an operating handle 9 secured to and projecting radially therefrom and provided at its extremity with a knob 10. When the handle 9 is oscillated fore and aft of the base member 1, and about the axis of the left-hand bearing member 6, the plate members 4—4 carrying the work feed head 3—3 are moved from the position shown in FIG. 2 to the position shown in FIG. 3.

The work feed head 3 includes a motor M and means driven thereby to operatively engage a work unit and feed it to the saw of the band saw machine to which the invention may be attached. The motor M may be supported from the forward end of the plates 4—4 by a bracket member, in a generally upright or vertical position as shown in FIGS. 2 and 3. The motor shaft 12 drives a spiral gear 13 intermeshed with a worm gear 14 secured to a generally horizontal shaft 15 mounted for rotation in a side bracket 16 carried by the end plates 4. The shaft 15 carries at its opposite end a bevelled gear 17 intermeshed with a similar gear 18, carried on the upper end of a generally vertical shaft 19 mounted for rotation in the bracket 16. The lower end of the shaft 19 carries a driving unit 20 for feeding work to the saw. The driving unit 20 includes a gear member 21 secured to the shaft 19 adjacent the end thereof but spaced therefrom. The extreme lower end of the shaft 19, below the gear 21 carries a freely rotatable roller 22, the function of which will become apparent hereinafter.

As previously indicated, the present invention is designed to be supported upon the head frame of band sawing machine in operative relation to the work table thereof and the saw element of the machine. To this end, there is provided a saw blade embracing yoke or frame member F, as shown in FIG. 4, including a front plate 23 removably held in place by a bolt 24. When removed, the plate 23 permits a band saw blade to be entered into the space behind the plate and the plate then secured in position by screw or bolt 24. The plate 23 on its rear face may be provided with a saw guide member 25 having a channel 26 formed therein. The saw guide member 25, on opposite sides of the channel 26 thereof carries one each of a pair of saw guide abutment members 27 which may be adjustably supported upon screw members 28, the heads of which are accessible from the outside face of the plate 23 as shown. The abutment members 27 are fixed in adjustment on opposite sides of the saw blade at a point adjacent to the root portions of the teeth of the blade and function to confine the blade at this point to a substantially fixed plane while permitting the rear edge of the blade to flex with respect to the forward edge thereof as the saw traverses a curved portion of a work piece or pattern. Skilled workers in the art are familiar with this characteristic movement of a band saw while sawing about a curved portion of a work piece. Within the saw embracing frame and rearwardly of the plate 23, there may be provided the usual backup roller R for the blade. (See FIG. 4.)

If desired, a guide pin 29 may be provided to insure proper movement of the work unit in respect to the saw blade. The pin 29 may be carried by the plate 23 in any convenient manner and is positioned just forward of the cutting edge of the saw and in coplanar relation with the saw blade. The pin 29, if desired, may carry a sleeve member rotatably mounted thereon to reduce friction.

From what has preceded it will be understood that the plate 23, when in place, is in fixed rigid relation to the base frame 1 and a positioning or spacing abutment 30 carried by the plate 23 along its right-hand edge as shown in FIG. 3, is positioned to be engaged by the adjacent edge of the bracket member 16 of the work feed head when the latter is in its lower position.

*The carriage assembly*

The work feed head 3 is resiliently urged into its lower and left-hand operating position, as shown in FIG. 2 and for this purpose the work feed head may be provided with a pair of laterally projecting pins 31'—31'. Only one of these pins is shown (see FIG. 2) and is carried by the bracket 16. The other pin 31', (not shown) may be carried by the forward end of the rear plate 4. To the pins 31'—31' there are attached tension coil springs 31, the opposite ends of which are connected to a carriage 32 mounted for sliding movement on the base frame 1. The carriage 32 includes a projecting arm 33 carrying at its rear end (the left-hand end as viewed in the drawings) a pair of laterally projecting pins 33a to which the spring members 31 may be attached as shown.

The carriage 32 comprises a pair of spaced longitudinal bars 34 rigidly secured by spaced transverse bars 32d and 32e to opposite sides of an intermediate spacing and bearing block 35 (see FIG. 14) provided with bores 36 which slidingly traverse spaced guide rods 37 carried by the base frame 1 and disposed in spaced parallel relation to one another at an elevation slightly below the base frame 1. The guide rods 37 may conveniently be secured to a depending arm portion 38 carried by the base frame 1 near the righthand end thereof. At the righthand end of each of the side bars 34 there is provided a depending work unit guide roller 39. Thus, it is to be understood that under the influence of the tension spring members 31, the carriage 32 is urged towards the saw (to the right as viewed in the drawings) and the work feed head 3, is urged downwardly and to the left towards the saw with the bracket 16 in engagement with the spacing abutment pin 30, in the normal position of the apparatus when a work unit is in the machine, and when the carriage latch and trigger lever 90, to be hereinafter described, is in inoperative position. It should be noted that the position of the rollers 39 with respect to the cutting area of the saw is important and the proper position for these rollers is that they be placed equidistant from and on opposite sides of the portion of the saw which is maintained against flexure by the guiding abutments 27. (See diagrammatic view FIG. 13.)

*The pattern member*

In arranging the work piece to be fed to the saw, there is associated therewith a pattern member 40 which is shown more clearing in FIGS. 5, 6, 7 and 8. The pattern member 40 includes a base portion 41 designed to be secured to a work piece 42 by any suitable means such as screws 43 which may be passed through suitable apertures 44 provided in the pattern base 41. The base member 41 of the pattern may be provided with an upstanding contoured peripheral rib portion 45 which as shown in FIG. 5 is contoured to correspond to the desired contour to be provided in the finished work piece. The inside vertical extent of the contoured rib 45 is designed to accommodate the driving unit 20 as shown in the detailed view of FIG. 8, with the roller 22 of said unit engaging the inner face of the rib 45 and the gear member 21 of the unit overhanging the upper edge of the rib 45 to operatively engage a series of upstanding spaced pins 46 which constitute gear teeth for intermeshing engagement with the teeth of the gear member 21. Thus, as the gear member 21 is driven, the pattern member and attached work piece will be moved upon the surface of the work table in work feeding relation to the saw member while the roller 22 of the work driving unit 20 traverses the inner face of the contoured rib 45, thus urging the opposite outer face of said rib into engagement with the rollers 39—39 and with the saw guide roller 29. Thus under operating conditions, the upstanding contoured rib 45 is resiliently clamped between the roller 22 and the guide rollers 39 and, if present, the saw guide pin 29. The pins 46 may be slightly bevelled as shown at 47 for the purpose to be hereinafter explained.

It should be noted that the coil spring members 31 which urge the carriage 32 towards the right as viewed in the drawings, are relatively stiff so that the guide rollers 39 carried at the end of the carriage adjacent to the saw function to provide substantial though resilient lateral support for the work unit as it is being fed into the saw.

It should also be noted that it had been found desirable to make the contoured rib 45 slightly thinner transversely at the sharply curved portions of the rib in order to preclude the saw blade from contacting the outer face of the rib as the work unit is swung around at sharply curved portions of the pattern under the influence of the work driving unit. This thinning of the rib portion is indicated by a legend in FIG. 5, and permits the springs 31—31 to move the pattern slightly away from the saw as the roller 22 of the driving unit 21 encounters the thinned portion of the rib.

*Blocking means for the work feeding head and for the carriage assembly*

In order to facilitate use and adjustment of the apparatus as thus far described, particularly, with respect to the control of the work feeding head during insertion and removal of a work unit, means are provided for blocking the work head in its elevated position so that both hands of an operator are free. This is important since it will be remembered that the working head is urged into its lower position by the heavily loaded coil springs 31. The means provided for blocking the working head in its elevated position may comprise a block 48 pivotally mounted on the block 38 for swinging movement about its vertical pivot, in a generally horizontal plane to position the block beneath one of the side plates 4 when the latter is in raised position. It will be understood that the position and the dimension of the block 48 is such that when swung counterclockwise about its pivot to a position such as shown in FIGS. 2 or 3, it will lie beneath the plate 4 as shown in dotted lines in FIG. 1.

Means is also provided for holding the carriage 32 in a retracted position against the tension of the springs 31, when desired, to move the guide rollers 39 out of the region of the saw blade. This restraining means for the carriage 32 may comprise a bar 49 pivoted at 50 to the carriage 32. The bar 49 is dimensioned between the pivot 50 and the free end 51 thereof, so that when moved 180° in a clockwise direction about its pivot 50, from the position shown in FIG. 2, the free end 51 may be placed in abutting engagement with the left-hand end of the plate 38, after the carriage has been retracted to the left against the biasing force of the springs 31—31. The bar 49 in this position will hold the carriage 32 with its rollers 39 clear of the area of the saw.

*Automatic control by sensing means*

The invention as thus far described is capable of satisfactory manual operation by manipulation of the handle 9 to raise the work feeding head into the position shown in FIG. 3 so that a work unit including a work piece and an attached pattern member (see FIG. 5) may be placed on the worktable of the saw and in operative position with respect to the blade thereof. The handle member 9 may then be manipulated to lower the work feeding head into the position shown in FIG. 2 and the motor M then energized by closing switch S (see FIG. 9) to drive the work unit into feeding relation through the saw, and at the completion of the sawing operation the handle may again be manipulated to raise the work feeding unit to remove the work unit from the saw. However, the invention also provides means automatically raising and lowering the work feeding head with respect to the base frame 1 of the apparatus and also provides means for automatically controlling the speed of the driving motor so that it may operate at a higher speed on the relatively long straight cutting course of the saw and at a relatively reduced rate of speed when the saw is traversing the sharply curved portions of the work unit. The speed control for the motor M may be any conventional switch controlled winding or impedance component as shown at 52 in the diagram of FIG. 9. The motor M, per se, forms no part of the present invention and may be any two-speed A.C. motor having a simple push button controlled speed modifying component, such as is included in the Sunbeam Mix Master motor, which operates normally at high speed but which can be operated at low speed by pushing and holding in a button on the motor casing which controls the speed modifying component housed within the motor casing. The push button switch 52 may be actuated by any convenient means such as a lever 53 pivoted at 54 and carrying at its free end a pivotally connected core member 55 operatively associated with a solenoid 56 which is connected in parallel with the motor circuit and controlled by a conventional push button micro-type switch member 57 operated in response to movements of a sensing or feeler finger 58 which is positioned to traverse the contoured rib 45 of the pattern member 40 in a manner to be hereinafter fully described. At the present time it suffices to say that as the sensing finger 58 encounters a long relatively straight stretch of the contoured edge portion of the rib 45 the switch 57 is opened and the solenoid 56 de-energized so that the motor M operates at normal high speed. When a sharply curved end portion of the pattern member approaches the saw, the finger 58 becomes disengaged from the controlling rib 45 and moves counter-clockwise to a position in which the switch 57 is closed to energize the solenoid 56 at which time the switch 52 is operated to render the speed control component operative to cause the motor to operate at low speed. As soon as the sensing finger 58 again contacts the long straight portion of the pattern rib 45, as the work unit swings about during cutting of the curved end portion of a work piece, the finger 58 swings in a clockwise direction and the switch 57 opens, thus de-energizing the low speed component of the motor whereupon the motor again operates at high speed.

The control for automatically raising and lowering the work feeding head includes an air cylinder 59 mounted in any convenient manner upon the base frame 1 and having a piston rod 60 extending from one end thereof, said piston rod being mechanically connected to the work feeding head by means of a linkage including a pair of link members 61 pivotally connected at one end to the piston rod 60, intermediately pivotally connected to the handle member 9 and connected at the opposite end to an arm 62 extending radially from the right-hand bearing pin 6. Thus as the piston (not shown) within the cylinder 59 moves within its cylinder, the piston rod 60 effects oscillatory movement of the handle 9 to cause the plates 4—4 on which the work feeding head is mounted to partake of the same compound movement previously described in connection with the manual operation of the apparatus under the control of the handle 9. The linkage including the links 61 is resiliently urged into the position shown in FIGS. 1 and 2 by the coil spring 63 (see FIG. 1) having its opposite ends connected to a pin 64 carried by said linkage and a pin (not shown) carried by the work feeding head. This arrangement normally maintains the piston of the cylinder 59 in its extreme right-hand position, as viewed in the drawings and the work feeding head in its lower operating position. Air under pressure or similar motive fluid may be applied to the cylinder 59 through a conduit 65, said conduit having one end in communication with the cylinder between the right-hand end of the cylinder and the piston, and the opposite end of the conduit being connected to a solenoid valve housing 66. The valve housing may be connected to any suitable source of air under pressure by a conduit 67. Within the valve housing 66 is mounted a conventional valve unit for controlling the admission of motive fluid to and the exhaust of fluid from the cylinder 59 under the control of a magnetic or solenoid actuator 68 which is under the control of a second sensing finger 69 which is arranged to ride upon the outer surface of the contoured rib 45 of the pattern member in advance of the saw. As the sensing finger 69 moves about its pivot in response to the changing contours of the pattern rib 45, it is arranged to actuate indirectly the switch mechanism 70 which controls energization of the solenoid 68 to supply fluid to and to exhaust fluid from the cylinder 59 as will be more fully explained hereinafter.

Referring further to the first sensing finger 58 which rides on the pattern rib 45 to control the speed of the driving motor M, the finger 58 may be pivotally mounted upon an upstanding pin 71 mounted upon an arm 72 carried by the base frame 1. The sensing finger 58 extends radially and downwardly from the upper end of the pin 71 and terminates in a portion 73 which rides on the outer face of the rib 45 of the pattern in advance of the position of the saw as shown diagrammatically in FIG. 5. The finger 58 is spring urged in a counterclockwise direction (FIG. 1), against the pattern rib 45 by tension spring 74 and swings in a counterclockwise direction to actuate the button 75 of the switch 57 as the finger swings inwardly when encountering a sharply curved portion of the pattern member. As the work unit swings about one end under the influence of the driving unit as the saw is cutting the sharply curved terminal portion of the work piece, the sensing finger 58 is out of contact with the pattern rib 45 but re-engages the same as the saw blade enters the long straight portion of the pattern beyond the sharply curved portion thereof. Thus when the sensing finger 58 reaches the relative position indicated as $58^2$ in FIG. 5 it swings outwardly in a clockwise direction to a position out of engagement with the switch button 75 whereupon the switch 57 opens and the solenoid 56 is de-energized, thus removing the low speed control component from the motor circuit, whereupon the motor again assumes high speed operating conditions.

The energization and de-energization of the solenoid control valve unit 66 for controlling the supply of motive fluid to and exhaust of fluid from the cylinder 59 is, as previously recited herein, under control of a second sensing finger 69. The finger 69 may be mounted upon the same upstanding pin 71 as supports the sensing finger 58. The sensing finger 69 comprises a radially and downwardly extending arm portion and a terminal finger portion, the latter terminating in a terminal portion 76 which rides upon the outer vertical face of the pattern rib portion 45, at a point intermediate the saw blade and the point of engagement of the sensing finger 58 with the pattern rib 45. The relative positions of the fingers 58 and 69 with respect to the saw blade are shown diagrammatically at 58′ and 69′ in FIG. 5. The sensing finger 69 likewise swings about the pin 71 in response to changes in the contour of the pattern rib 45 and its oscillatory motions are transmitted to a switch 70 which controls energization of the solenoid valve 66 by a ratchet mechanism 77 shown diagrammatically in FIGS. 10 and 11. The ratchet mechanism 77 includes two pawl members 78—79 pivotally mounted to opposite ends of an oscillating lever 80, the latter being pivoted intermediate its ends on the stationary pin 81. The pawl members 78—79 are resiliently urged into operative engagement with the toothed surface of the ratchet wheel 82 by a spring member 83 and the oscillating lever 80 is interconnected with the sensing finger 69 by link 84. The ratchet wheel 82 is mounted on an upstanding stud 85 which may be carried by the bracket 11. Preferably the ratchet wheel 82 is mounted for free rotation about the stud 85 but if desired, a friction disk 86 may be placed on the upper surface of the ratchet wheel in order to check any inertia that may be developed therein under the impulses of the driving pawls 78—79. The ratchet 82 carries a pair of diametrically disposed abutment cams 87 which are positioned for engagement with a switch actuating spring arm 88. The spring arm 88 has one end anchored to the casing of switch 70 in overlying relation to the switch button 89 thereof, the arrangement being such that normally, when the spring arm 88 is not in engagement with one or the other of the cam abutments 87, it is disposed out of engagement with the switch actuating button 89, at which time the switch 70 is open. When the spring arm 88 is engaged by one or the other of the cam abutments 87 it is deflected towards the switch casing 70 and depresses the switch button 89 to close the switch 70. When the switch 70 is thus closed, the solenoid 69 is energized to open the solenoid valve 66 to admit operating fluid to the cylinder 59 to raise the work feeding head out of engagement with the work unit. The circuit arrangement for the control of the solenoid valve 59 is shown diagrammatically in FIG. 12. Under the arrangement as shown it will be understood that as the terminal portion 76 of the sensing finger 69 traverses the rib 45 of the pattern it will maintain the solenoid valve 59 de-energized until such time as the finger 69 swings counterclockwise on its pivot (FIG. 1) in response to encountering a sharply covered end portion of the pattern.

It is evident, that the sensing finger 69 will swing about its pivotal support on the pin 71, in a counterclockwise direction and in a clockwise direction in response to the contours of the pattern rib traversed by said finger. The ratchet mechanism interposed between the finger 69 and the switch button 89 which controls energization of the solenoid valve 59, is designed to accommodate patterns having a predetermined number of curved portions, interspersed with relatively straight portions, so that a predetermined number of oscillations of the finger 69 is required to bring about energization of the solenoid valve through the actuation of the switch 70. Thus the pawl members 78 and 79, mounted at opposite ends of the oscillating lever 80, which lever is in turn connected by link 84 to sensing finger 69, are designed to alternately impart a driving impulse to the ratchet 82 on each oscillation of the finger 69 regardless of whether the finger 69 is moving clockwise or counterclockwise with respect to its supporting pin 71. Thus the number of teeth on the ratchet 82 are determined by and correlated with the number of oscillations made by the sensing finger 69 in making a complete traverse of the pattern rib 45.

When the work unit is first associated with the saw, the sensing fingers 69 and 58 occupy the relative positions indicated by the reference characters 69′ and 58′ in FIG. 5. The movement of the work unit into the saw with the fingers in this position will give to the finger 69 an impulse which moves the ratchet wheel 82 from the position shown in FIG. 11 in which the switch 70 is closed and the cylinder 59 is under pressure, to the position shown in FIG. 10, thus de-energizing the solenoid valve, and permitting the cylinder 59 to exhaust and the work feeding head assumes its lower operative position under the influence of the springs 31—31. During this operation the sensing finger 58 is out of contact with the rib 45 of the pattern as shown by the reference character 58′ in FIG. 5 with the result that the motor M is operating at low speed. As the work unit is driven in response to rotation of the driving unit 20 as previously described, the work unit swings about the saw until the pattern rib is again in operative engagement with both sensing fingers 58 and 69, and with the work guide rollers 39 and is moved therealong in the direction of the arrow in FIG. 5. Thus the work unit gradually swings in the direction of the curved arrow at the upper end of FIG. 5 to swing the work unit about the saw and present the opposite long edge of the unit to the saw. As the finger 69 traverses the contoured rib 45 it oscillates about its pivot a number of times dependent upon the contours of the rib it traverses. In the example illustrated in the drawings, the ratchet wheel requires three cycles of oscillation, each cycle including a counterclockwise movement followed by a clockwise movement (or 6 pawl strokes) for one complete revolution. In the arrangement as shown, 6 pawl strokes will move the ratchet wheel 82 one complete revolution from the position of the parts as shown in FIG. 11. The sixth pawl impulse which closes the switch 70 and causes the work feeding head to raise, is delivered when the finger 69 encounters the curved end portion of the pattern member adjacent the starting point of the saw cut, such position of the finger being indicated at 69², in FIG. 5. It will be understood that when the parts occupy the position shown in FIG. 11 the cylinder 59 is activated to raise the work feeding head due to the fact that at this moment the switch 70 is closed and energizes the solenoid to open the valve 66 and that when the feeler finger 69 is given its first clockwise movement as a work unit is put into the machine, the ratchet wheel 82 is given an impulse to rotate the ratchet wheel one increment, and moves the cam 87 out of engagement with the spring arm 88, thus opening the switch and closing the valve 66 thus permitting the cylinder 59 to exhaust whereupon the work feeding head is lowered into operative engagement with the new work unit and sawing is started at once, since the motor M is operating continuously at either high or low speed under the control of the speed control finger 58.

In the automatic operation of the invention, at the time of insertion of a work piece into operative position with the rib 45 of the pattern piece in position to be engaged between the roller 22 and the rollers 39, it is desirable to maintain the carriage 32 in a position such that the rollers 39 are disposed in a position in which the peripheries of said rollers lie in a plane substantially parallel to the saw blade and slightly to the right of the periphery of the guide roller 29, as viewed in the drawings. See FIG. 13. This is accomplished by the carriage latch and trigger lever 90 previously referred to, and which is pivoted intermediate its end at 91 to the side surface of the base member 1. The left-hand end of the lever 90, as viewed in the drawings, is dimensioned to drop behind cross bar 32d when the work feeding head 3 is moved to elevated position such as shown in FIG. 15. When the parts are so engaged the carriage 32 is held in a position in which the rollers 39 are disposed with respect to the roller 29, as shown in FIG. 13. This facilitates insertion and removal of a work piece with respect to the machine.

The opposite end of the latch and trigger lever 90 is provided with a finger portion 92, bent out of the plane of the lever 90 and underlying the path of movement of the link 61, as shown in FIG. 1. Thus when the work feeding head is lowered, the link 61 strikes the finger portion 92, thereby rocking the lever 90 and raising the left-hand end of the lever clear of the bar 32d, thereby releasing the carriage for movement under the influence of the biasing springs 31.

The lever 90 is biased by spring 93 to urge the left-hand end of the lever into locking engagement with the bar 32d of the carriage so as to automatically latch the carriage against further movement to the right, as shown in the drawings, when the work feeding head is raised to inoperative position such as shown in FIG. 3.

The relative position of the rollers 39, the driving roller 20 and the guide roller 29 is important and is shown diagrammatically in FIG. 13. The roller 29 is disposed in front of the toothed edge of the saw blade with its axis disposed in the median plane of the saw blade. The diameter of the roller 29 is slightly greater than the thickness of the saw blade at the toothed edge thereof. Thus, the pattern piece which engages the roller 29 in operation, is kept clear of the saw teeth. During a sawing operation the rollers 39 are positioned at equal distances in front of and behind the root line of the saw teeth or at equal distances in front of and behind the plane passing through the saw abutments 27—27 and perpendicular to the plane of the saw, with the peripheries of such rollers lying in a plane parallel to the plane of the saw and lying tangent to the periphery of the roller 29. The drive roller unit 22 carried by the work feeding head is disposed opposite to the root line of the saw teeth or may if the guide roller 29 is used, be placed opposite to the axis of said roller. In FIG. 13 the distances A and B are substantially equal.

It will be understood that the pattern member illustrated in FIG. 5 is but for the purpose of example only and that pattern members having any desired peripheral contour may be employed to produce a work piece having corresponding contours. The number of teeth on the ratchet member 82 is made to correspond to the number of variations in the contour of a given pattern member which are effective to cause oscillations of the sensing finger 69, thereby to determine the period in the cycle of operation of the power cylinder 59, to raise and lower the work feeding head.

In further connection with the feature of bevelling the pins 46 on the pattern rib, as shown at 47, it has been found that this is desirable to avoid possible interference between the lower end of the driving unit 20 when the work feeding head is swung from operative to inoperative position and vice versa, under the control of either the handle member 9 or the power cylinder 59. By bevelling the inside portions of the teeth at the upper ends thereof, undesirable contact between the teeth and the driving unit 20 is avoided, particularly in instances where the pattern rib 45 on opposite longitudinal edges thereof, are relatively close together as is the case, with the pattern member illustrated in FIG. 5.

It will be understood, of course, that the feed head blocking means 48 and the carriage blocking means 49 are primarily used during mounting and adjustment of the apparatus and are not normally used during sawing operation.

From the foregoing description it will be understood that the present invention provides means for feeding a work unit including a pattern member and a work piece, through a band sawing machine so that the work piece may be sawed to a predetermined peripheral contour as determined by the pattern member secured thereto. The work unit placed manually in the saw unit is fed to the saw by power means designed to operate at two different speeds by control means operating in response to the varying contours of the pattern member. Also, the work feeding means is movable into and out of operative position with respect to a work unit either manually, or automatically by means operating in response to the complete traverse of the pattern member by a sensing finger member. Furthermore, means are provided for releasably locking the work feeding unit in an elevated inoperative position and other parts of the apparatus in position to provide ready access to that portion of the apparatus in the immediate vicinity of the saw blade.

It will be understood by those skilled in the art that the embodiment of the invention illustrated in the drawing is but for the purpose of example only and that various changes may be made in the size, proportion and arrangement of parts of the apparatus without departing from the spirit of the invention which is set forth more clearly in the appended claims.

I claim:

1. A work feed device for band saw machines comprising a base member adapted for mounting on a band saw machine above and in spaced relation to the work table thereof and in a generally horizontal position, a work driving unit mounted on the base member for movement vertically and horizontally with respect to the base member, a carriage member movably mounted on the base member for general horizontal movement towards and away from the work driving unit, means for limiting the movement of the work driving unit towards the base member, and means for resiliently urging the carriage and the work driving unit towards each other to operatively engage a work piece when disposed therebetween, the carriage member carrying spaced rollers depending therefrom at the end thereof adjacent to the work driving unit, said rollers being mounted for rotation on substantially vertical axes adapted to be disposed in front of and to the rear of the saw blade of a machine on which the work feed device is mounted, and wherein said work driving unit carries a depending work driving member mounted for rotation on a substantially vertical axis disposed between the axes of the rollers on the carriage and generally parallel thereto, and means for driving the work driving member, said rollers and said work driving member resiliently engaging the opposite faces of a pattern rib carried by the work unit, when disposed therebetween.

2. The apparatus described in claim 1 wherein the rollers carried by the carriage member are spaced respectively substantially equal distances in front of and to the rear of the cutting edge of the saw and wherein said driving member is disposed substantially in opposition to the cutting edge of the saw.

3. The apparatus described in claim 2 wherein said limiting means includes an abutment member on the base member and positioned to be engaged by the work driving unit when the latter is in operative position to space the work driving member a predetermined distance from the plane of the saw.

4. A work feed device for band saw machines comprising a base member adapted for mounting on a band saw machine above and in spaced relation to the work table thereof and in a generally horizontal position, a work driving unit mounted on the base member for movement vertically and horizontally with respect to the base member, a carriage member movably mounted on the base member for general horizontal movement towards and away from the work driving unit, means for limiting the movement of the work driving unit towards the base member, and means for resiliently urging the carriage and the work driving unit towards each other to operatively engage a work piece when disposed therebetween, means for moving the work driving unit outwardly and upwardly away from the adjacent end of the carriage member to separate the work driving member from the rollers carried by the carriage in order to facilitate the insertion of a work unit therebetween, and wherein said means for resiliently urging the carriage and work driving unit together includes spring means urging the work driving unit downwardly and towards the carriage member.

5. A work feeding device for band saw machines comprising a base member adapted for mounting on a saw machine above the work table thereof in substantial parallel relation thereto, a carriage member slidably mounted on the base member for movement transversely of the plane of the saw, spring means urging said carriage towards the plane of the saw, a pair of work unit engaging rollers carried by the carriage near the saw end thereof, adjustable abutment means for restraining said carriage against movement towards the saw and in a position to dispose the rollers adjacent the plane of the saw, a work driving unit movably mounted on the base, means mounting the work driving unit for movement towards and away from an adjacent end of the carriage, said work driving unit carrying a driving member mounted for rotation on an axis disposed between the axes of the rollers on the carriage and lying in plane spaced outwardly of the adjacent end of the carriage, means for moving the work driving unit towards and from the plane of the saw stop means for limiting the movement of the work driving unit towards the saw, and means engaged by said lastmentioned moving means for the work driving unit, to move the adjustable abutment means to release the carriage for movement towards the plane of the saw when the work driving unit moving means is moved to position the work driving unit in work driving position.

6. A work feeding device for band saw machines comprising a base member, a rotatable work-unit-engaging drive member carried thereby, variable speed means for driving said member to feed a work unit to a saw, means for moving the driving member into and out of a position to operatively engage a work unit, sensing means positioned to be engaged by the periphery of a work unit as the same is fed to the saw, power means responsive to movement of said sensing means to move the work driving unit into operative and into inoperative positions at predetermined points in a work cycle and means responsive to movement of the work under the influence of said drive means for varying the speed of the drive means.

7. A work feeding device for band saw machines comprising a base member, a rotatable work-unit-engaging drive member carried thereby, means for driving said member to feed a work unit to a saw, means for moving the driving member into and out of a position to operatively engage a work unit, sensing means positioned to be engaged by the periphery of a work unit as the same is fed to the saw, power means responsive to movement of said sensing means to move the work driving unit into operative and into inoperative positions at predetermined points in a work cycle, the means for driving the work-unit-engaging member includes power means to drive the work driving unit at either of a plurality of different speeds, movable sensing means positioned to be engaged by the periphery of a work unit during a sawing operation and wherein means are provided operating in response to movement of said last-mentioned sensing means for controlling the speed of the work unit driving means.

8. In a work driving means for feeding work to a saw machine, a base member, a pair of rollers depending therefrom and positioned in spaced parallel relation, means movably mounting the rollers for movement towards and from the plane of the saw, a work unit driving member mounted on the base member in opposition to said rollers and in spaced relation thereto, said work driving member and said rollers being disposed on opposite sides of the plane of the saw with the axis of said work driving member substantially midway between the axes of the rollers and resilient means urging the work driving member and said rollers together to operatively engage opposed portions of a work unit disposed therebetween and stop means for positioning the work driving unit with respect to the saw.

9. In a work driving means for feeding work units to a saw, a pattern member adapted to be secured to a work piece, said pattern member including an upstanding rib carrying a series of upstanding teeth, a work drive unit including a roller for engaging the rib on the pattern member and a toothed gear for engaging the upstanding teeth of said rib, means for swinging the work driving unit up and out of operative engagement with the rib member, said teeth being bevelled at the upper end thereof to preclude interference between the teeth and the work driving unit during swinging movement of the latter.

10. A work feeding device for a saw machine having a worktable comprising a base member adapted to be mounted on a saw machine in upwardly spaced relation to the worktable thereof, means on the base member for defining the plane of saw travel, a pair of rollers movably mounted on the base for rotation about spaced, substantially vertical axes, a work driving unit including a rotatable driving member and means for driving same, said member being disposed in opposition to said rollers and on the opposite side of the plane of the saw, means for moving the driving member to and from operative position to permit insertion of a work unit between it and said rollers, and means for urging said driving member and said rollers towards each other and into engagement with a work piece inserted therebetween and stop means on the base member engageable by the work driving unit for positioning the driving member thereof in operative position with respect to the saw.

11. The apparatus described in claim 10 wherein the means for moving the work driving unit includes spaced arms mounted for swinging movement generally parallel to the plane of the base member, means for swinging said arms to move the work driving unit into and out of operative relation with the work unit, a trigger lever pivoted on the base and including means for holding the rollers in predetermined position with respect to the plane of the saw when the work driving unit is in inoperative position to facilitate insertion of a work unit between said driving member and said rollers, and means for releasing said trigger lever when the work driving unit is moved to operative position.

12. A work feed device for band saw machines comprising a base member adapted for mounting on a band saw machine in spaced relation to the work table thereof, a carriage member and means for mounting said carriage member on said base member for movement within a predetermined plane, a work driving unit and means for mounting the work driving unit on said base member for movement transversely of said predetermined plane to move the work driving unit into and out of general alignment with the path of movement of said carriage member, resilient means for urging the carriage member and the work driving unit towards each other to operatively engage a work piece when disposed therebetween, and stop means for positioning the work driving unit with respect to the base member under the influence of said resilient means to dispose the work driving unit in substantial alignment with said carriage member.

References Cited in the file of this patent

UNITED STATES PATENTS

| | | |
|---|---|---|
| 82,113 | Grosvenor | Sept. 15, 1868 |
| 445,617 | Woodford et al. | Feb. 3, 1891 |
| 614,089 | Coleman | Nov. 15, 1898 |
| 660,642 | Keyes | Oct. 30, 1900 |
| 1,337,695 | Emery | Apr. 20, 1920 |
| 1,567,865 | Sawyer | Dec. 29, 1925 |
| 2,125,239 | Hawes | July 26, 1938 |
| 2,141,631 | Whitney | Dec. 27, 1938 |
| 2,142,863 | Whitney | Jan. 3, 1939 |
| 2,934,107 | Hawkins | Aug. 26, 1960 |

FOREIGN PATENTS

| | | |
|---|---|---|
| 788,839 | Great Britain | Jan. 8, 1958 |